United States Patent [19]

Voss

[11] Patent Number: 5,168,895
[45] Date of Patent: Dec. 8, 1992

[54] PRESSURE-RELIEF VALVE WITH TEFLON SEAL

[75] Inventor: Richard Voss, Schwerte, Fed. Rep. of Germany

[73] Assignee: Richard Voss Grubenausbau GmbH, Schwerte, Fed. Rep. of Germany

[21] Appl. No.: 679,058

[22] PCT Filed: Jul. 27, 1990

[86] PCT No.: PCT/DE90/00581
  § 371 Date: May 1, 1991
  § 102(e) Date: May 1, 1991

[87] PCT Pub. No.: WO91/03621
  PCT Pub. Date: Mar. 21, 1991

[30] Foreign Application Priority Data

Sep. 1, 1989 [DE] Fed. Rep. of Germany ....... 3943495
Jul. 6, 1990 [DE] Fed. Rep. of Germany ....... 4021622

[51] Int. Cl.$^5$ .............................................. F16K 17/04
[52] U.S. Cl. ................................... 137/494; 137/538; 251/368; 251/900
[58] Field of Search ................ 137/494, 538; 251/368, 251/900

[56] References Cited

U.S. PATENT DOCUMENTS

| | | | |
|---|---|---|---|
| 3,482,594 | 12/1969 | Simon | 137/538 |
| 4,284,101 | 8/1981 | Weirich | 137/494 X |
| 4,530,373 | 7/1985 | Bork | 137/538 X |
| 4,552,172 | 11/1985 | Krieger | 137/538 X |
| 4,790,347 | 12/1988 | Weirich | 137/538 X |

Primary Examiner—Robert G. Nilson
Attorney, Agent, or Firm—Herbert Dubno

[57] ABSTRACT

A pressure-relief valve for the protection of hydraulic units in underground mining, functionable against a sudden overload in pressure, is provided including a valve housing having an upper part and a connection piece, a valve spring lodged against the upper part, a valve piston longitudinally slidable within the connection piece and engageable forceably at one end against the valve spring and having a blind bore and radial bores communicating perpendicular thereto through which a pressure medium is flowable, and at least one sealing ring against which the piston travels which is arranged in the connection piece. The sealing ring is positioned to adjoin the radial bores, consists of a very hard plastic material producing very low friction and has a rectangular cross section.

8 Claims, 2 Drawing Sheets

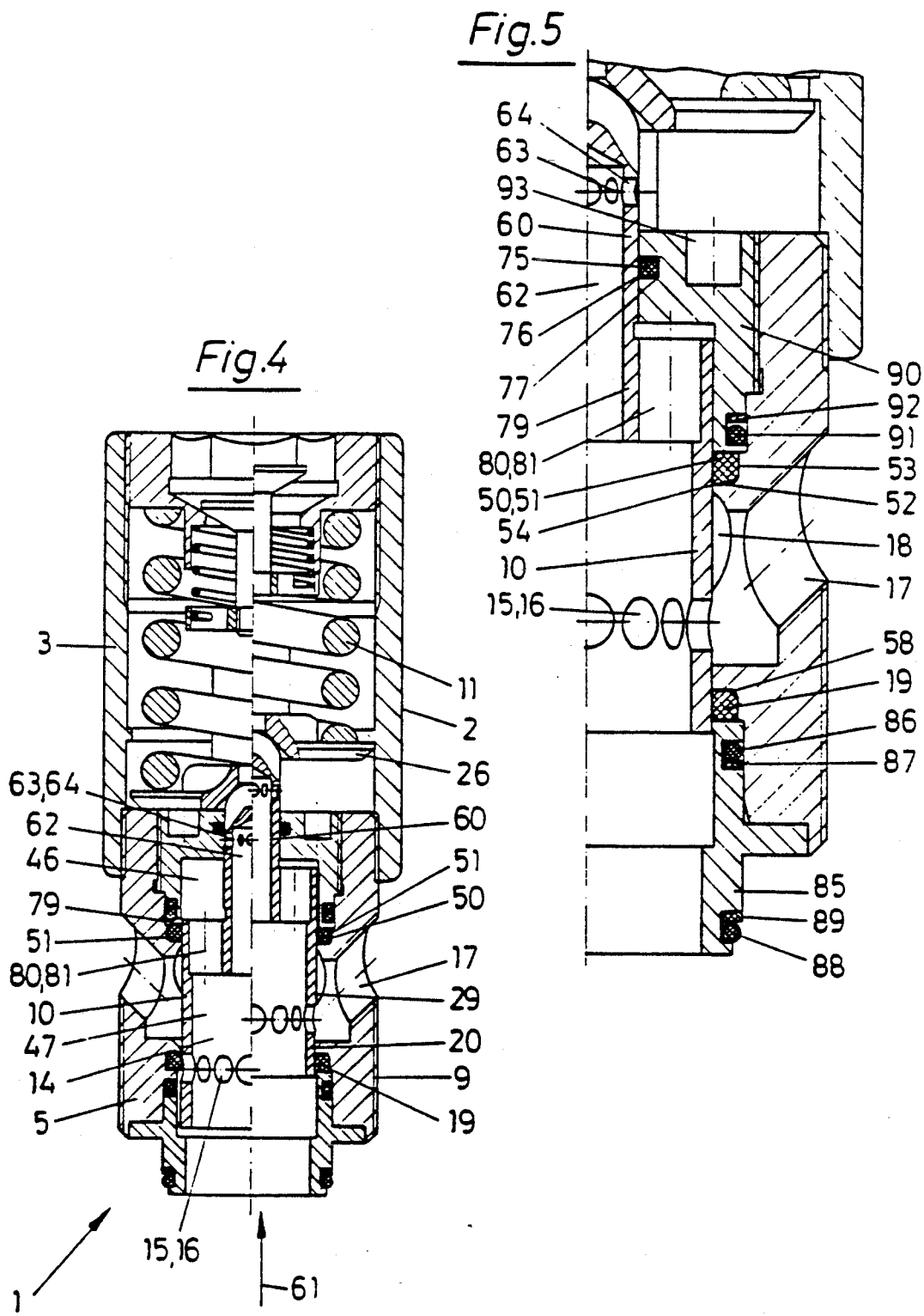

PRESSURE-RELIEF VALVE WITH TEFLON SEAL

FIELD OF THE INVENTION

The invention relates to a pressure-relief valve for the protection of hydraulic units in underground mining, particularly of hydraulic face support systems, against sudden overload due to rock pressure or similar causes, with a valve piston in the valve housing, slidable in the inlet bore against the force of a valve spring and closing off the pressure medium with respect to the outlet bores, this piston having a blind bore and therefrom starting radial bores, which are shaped to correspond with a sealing ring provided in the connection piece.

THE RELATED ART

Such pressure-relief valves, also known as safety valves, are used there where systems, particularly hydraulic struts systems in underground mining are in danger of being damaged by excessive pressures. These hydraulic struts are arranged either as individual struts or as an integrated shield-type support. Because of the particular dangers involved, there are official requirements for providing pressure-relief valves for such shield-type support systems, but also for individual hydraulic struts, in order to prevent permanent damage or even destruction endangering the miners in cases of overload From DE-OS 28 30 891 a pressure-relief valve is known, wherein excessive pressure in the hydraulic system is reduced by means of a valve spring stressed between the locking screw and the valve piston On the valve spring cap or the valve spring retainer a conically or spherically shaped valve-closing body is provided which is lifted off the valve seat in case of overload. On the piston a damping cylinder is provided, which limits the flow passage opening. However, such valves do not afford the locking safety required for the use as pressure-relief valves or safety valves in mining. Furthermore, an accurate positioning, particularly of the spring is very difficult, which means that another requirement, the one for a safe response of such mining safety valves is not fulfilled.

From the DE-OS 33 14 837 another pressure-relief valve is known wherein the valve spring is arranged in the valve housing so that it presses on the valve spring cap and thereby on the valve piston and this way influences the opening of the valve corresponding to the setting. The valve piston is slidably guided on a piston-pin bore formed in the guide, whereby the required sealing is provided by an O-shaped annular seal located in a groove. Each time, the O-ring has to be completely overriden by the radial bores of the valve piston, before the pressure medium can exit in case of overload. Due to this excessive load, such O-ring valves have a short operational life. A further drawback of these known pressure-relief valves are the low flow rates of only 40 to 100 liter per minute. This is not satisfactory for the required safety and quick response of such valves. Besides, it is disadvantageous that the valve springs involved have to use wire of considerable thickness and have considerable coil diameters in order to counteract the pressure, which again requires corresponding overall valve dimensions. The higher the flow rate, the bigger must be the valve springs, and thereby the entire valve housing. Particularly in underground mining it is already not possible to use such valves, only because of their large dimensions. Also, the required cross sections for the evacuation of pressure medium are not available.

Attempts have been made to increase the flow rate by using larger valve pistons and by conferring a special configuration to those valve pistons, as well as by assigning a control piston. However, the response time remains unsatisfactory in this case because the O-rings produce too much friction. As a result of such unsatisfactory closing values, the operation of the valves is too inaccurate. Furthermore, the operational life of such O-rings is very unfavorable.

It is the object of the present invention to create a pressure-relief valve with favorable closing values and with seals insuring effective and long-term operation.

DETAILED DISCUSSION

The problem is solved according to the invention in that the sealing ring assigned to the valve piston is made of a very hard plastic material producing minimal friction.

Surprisingly favorable closing values are achieved this way, because the friction is reduced so much that even the movements of a valve piston with a very large diameter are not impaired by friction. Such sealing rings, which are no longer flexible, still afford an efficient seal, have a very long life and make possible the already-mentioned favorable closing values, because the friction between the sealing ring and valve piston is reduced to a minimum. A controlled sealing is reached because the sealing ring is formed exactly on the sealing edge of an annular sealing zone. The sealing ring has a hardness of 50–90 shore D, preferably of 54–60.

Advantageous sealing combined with friction which is still low can be achieved when the sealing rings have a rectangular cross section. Such sealing rings lead to a level seal, and the occurring friction can not noticeably impair the movements of the valve piston. This way it is also advantageously possible to shape the sealing piston for instance like a tubular sleeve with a very large diameter, which leads to a considerable increase in the admissible and possible flow rate, particularly when a control piston having a smaller diameter is used on the valve piston. The rectangular configuration of the sealing ring facilitates assembly and insures a safe lodging in the assigned groove.

A particularly advantageous embodiment of the invention proposes that the annular groove receiving the rectangular sealing ring be provided at the sealing edge with a bevel in the groove bottom. Due to this, the sealing ring forms precisely in the area of the sealing edge the desired annular sealing zone, as a result of the fact that when it is introduced in the annular groove, in this area it is strained to such extent that it will press itself against the sealing piston and will provide here a permanent annular seal. As proposed by the invention, in order to keep the dimensions of the sealing ring within limits and still be able to insure an effective seal, the bevel connects the groove bottom and the support wall which runs slightly above the radial bores of the closed valve. This bevel takes care of the described deformation of the sealing ring and presses it close against the moving sealing piston, whereby especially the material of the sealing ring insures that the desired and predetermined sealing zone is observed also during longer operation interruptions, i.e. when the pressure-relief valve is not triggered.

A controlled fit of the sealing ring in the area of the sealing edge is reached when the bevel is arc-shaped. Besides, this configuration protects the sealing ring from damage while it fits the sealing piston snugly, an already mentioned advantage. In a pressure-relief valve with a throughflow rate of more than 2000 liter, it is still possible to work with favorable overall dimensions when in a valve piston with integrated control piston and between the transverse bores forming chambers with equal pressure and serving as outlet bores, sealing rings are provided on both sides of the transverse bores, whereby the bevels are formed on the opposite support walls. Although there are now two, even three sealing rings hampering by friction the movements of the valve piston and the control piston, particularly their return stroke, a quick return stroke of the piston is insured, because of the special design of the sealing rings, which afford a complete sealing and at the same time do not at all or only insignificantly hamper the valve piston and control piston. It is also advantageous that thereby wider sealing rings can be used, without increasing the friction significantly. Thereby, it is advantageous to make also the sealing ring assigned to the control piston of a plastic material producing little friction and to arrange it in a groove with a bevel.

In a particularly advantageous embodiment facilitating the production, the sealing ring is cut off by turning from a plastic tube. This way, the suitable configuration can be preserved, without creating additional manufacturing expenses. Such sealing rings can be produced in large quantities and very quickly, without great expense.

Particularly advantageous has proven a plastic teflon A sealing ring made of this plastic teflon material TFM 1600 ®. A sealing ring made of this plastic teflon material TFM 1600 ® has low flexibility, but handles perfectly, namely even then when in the annular grooves bevels are provided, as proposed by the invention. Based on the level, respectively controlled sealing achieved by the rectangularly shaped sealing rings, this material is advantageous because of its special composition, particularly with regard to the low friction. Furthermore, there can be insured with this plastic teflon material TFM 1600 ® a very long service life of the pressure-relief valves.

Since, as already mentioned the teflon ® sealing rings have little flexibility, special measures have to be taken in order to place them efficiently in the area of the sealing piston. According to the invention, this is achieved by inserting in the inlet bore of the connection piece, on the inlet side, an inwardly and outwardly stepped plug-in socket equipped with an O-ring, affixing the sealing ring. On the other hand, in order to affix the upper sealing ring, if available, a guide screw with an O-ring is provided in the connection piece in the inlet bore on the outlet side, which fastens the upper sealing ring and at the same time guides the control piston. This way, on the inlet side, and if necessary on the outlet side too, an efficient fastening of the respective sealing ring is achieved in correspondence with the opening direction of such a pressure-relief valve. The plug-in socket is advantageously actuated by the pressure of the pressure medium and fixed in the connection piece, without being locked or screwed in. On the other hand, the guide screw is screwed in from the spring space and thereby efficiently locks the upper sealing ring, preventing any movement of the same from its position in the assigned annular groove, while in operation The invention is remarkable especially due to the fact that it improves considerably the modus operandi of the pressure-relief valve, insuring exceptionally favorable closing values and service life, because the valve piston is not impaired or hindered by the friction of the sealing rings, and as a result these rings are gently treated. With the solution proposed by the invention, first of all it is possible to select practically any diameter for the sealing piston, since their movement, especially during the return stroke, are hindered so little by the forcibly required sealing rings that the movement of the valve piston is practically not influenced, even when it has a considerably enlarged diameter. Due to the very large diameter of the valve piston, such pressure-relief valves can allow for a flow rate of up to 2000 liter and more, thus advantageously meeting the requirements of underground mining.

BRIEF DESCRIPTION OF THE DRAWING

Further details, advantages and objects of this invention may be seen from the following description of the pertaining drawing, showing a preferred embodiment with the thereto related details. The drawing shows.

DETAILED DESCRIPTION

Figure 1:
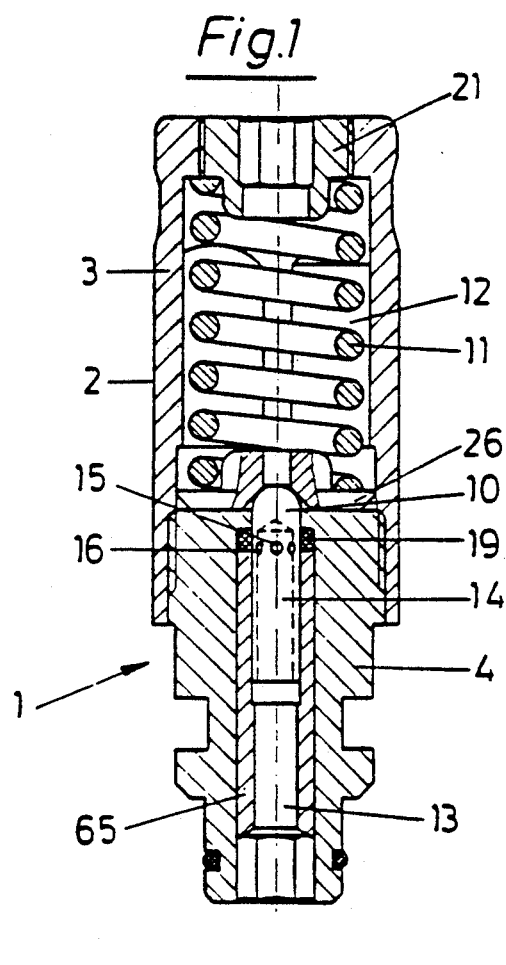
FIG. 1 a simple pressure-relief valve with rectangularly shaped teflon sealing rings, FIG. 2 an enlarged representation of the valve according to FIG. 1 in the sealing area, FIG. 3 a schematic representation of the pressure-relief valve according to FIGS. 1 and 2, detailing in an enlarged reproduction the bevels in the annular grooves, FIG. 4 a pressure-relief valve with differential valve piston in section and, FIG. 5 an enlarged reproduction of the sealing area of the pressure-relief valve shown in FIG. 4.

FIG. 1 shows a pressure-relief valve (1) with a basically two-part valve housing (2), whereby the upper part (3) and the connection piece (4) are screwed together. The connection piece (4) is here connected via a plug-in connection, for instance with a hose or a with a unit to be protected, while according to FIG. 4 an outer connection thread (9) is provided, by means of which such a pressure-relief valve (1) can be screwed to the unit to be protected.

Inside the valve housing (2), the valve piston (10) is supported slidably against the force of spring (11) in the inlet bore (13). The valve spring (11) does not fill up the spring space (12). It rests against the inner wall of the upper part (3) and allows the passage of the pressure medium from inlet bore (13) via the blind bores (14) and the radial bores (15, 16), whereby the respective opening value of the pressure-relief valve (1) can be preselected by an adjusting screw (21). In the adjusting screw (21) a bore is provided for the discharge of the pressure medium.

When the valve is triggered, the valve piston (10) has to travel over the sealing ring (19) lodged in an annular groove (55). The special configuration of the annular groove (55) is clearly shown in FIGS. 2 and 3.

The valve piston (10) rests against the spring plate (26) bearing the valve spring (11), which on the opposite side rests against the set screw (21), respectively on the upper part (3).

Figure 2:
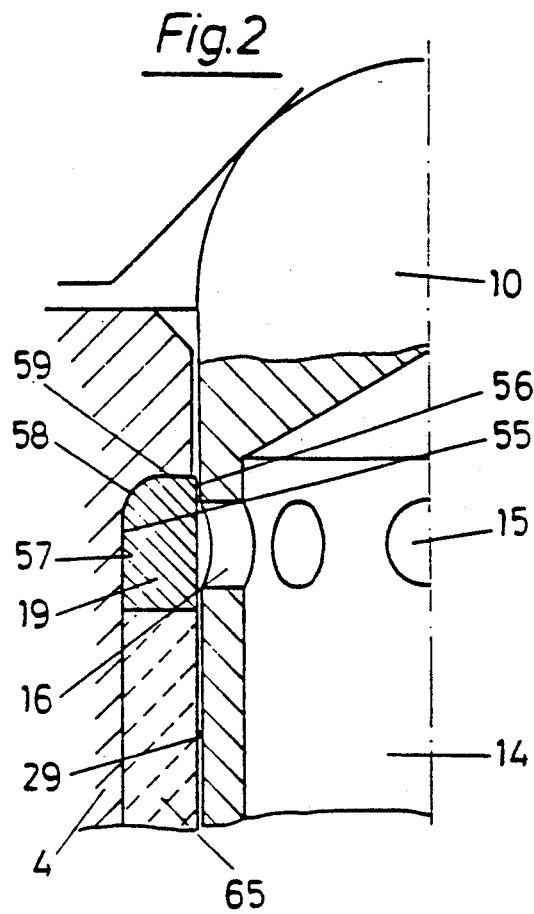
Figure 3:
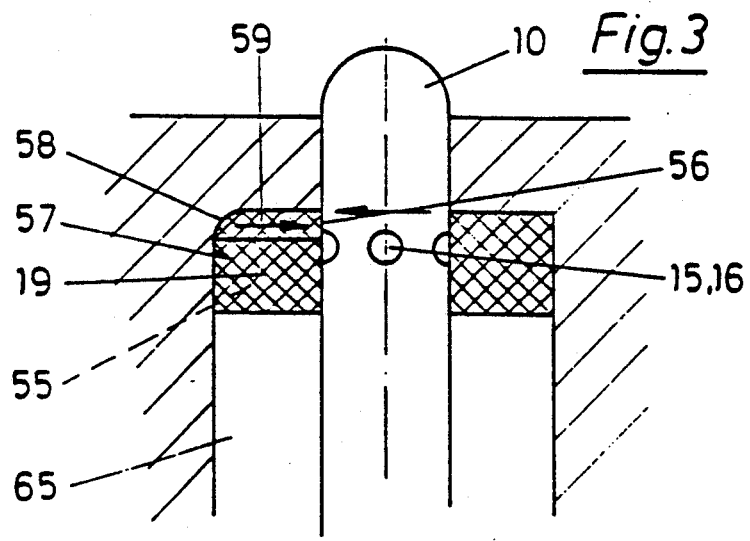

The outer wall (29) of the valve piston (10) is smooth, so that it can move without difficulty along the sealing ring (19), as shown in FIG. 2. Thereby, a close fit of the sealing ring (19) together with an optimal sealing is achieved above the radial bores (15, 16) precisely in the area of the sealing edge (56) due to the fact that the groove bottom (57) and the support wall (59) are connected over a bevel (58), as shown in FIGS. 2 and 3. This leads to the deformation, respectively the forcible deformation of the sealing ring (19), so that an even closer fit is insured in the area of the sealing edge (56). Thereby, the bevel (58) is advantageously curved or arc-shaped, in order to prevent the damaging of sealing ring (19) made of a very unyielding material.

By comparison, FIG. 3 details the arrangement of a sealing ring (19) lodged in a regular groove (right side) and of a sealing ring lodged in a groove with a bevel (58) (left side). In order to fasten the sealing ring (19) the bore in the connection piece (4) is enlarged so that the fastening pipe segment (65) can be inserted to hold the sealing ring (19) in position. With the aid of arrows it is shown where the sealing ring (19) is particularly closely fitted to the valve piston (10).

In the embodiment of FIGS. 4 and 5, a tubular sleeve (20) with a large flow-discharge surface is provided as valve piston (10). This tubular sleeve (20) has a blind bore (14) and radial bores (15, 16). Here too, care is taken to avoid the penetration of the pressure medium from the area of the inlet bore (13) into the pressure-relief valve (1), by means of the special sealing ring (19). The outer wall (29) of the sealing piston (10), respectively the tubular shell (20) is completely smooth, so that when it rides over the sealing ring (19) only normal friction is produced. On the sealing piston (10), centrally and thereby in the valve axis, a control piston (60) is formed, which is loaded via valve spring (11) in a direction opposite to the opening direction (61). This valve spring (11) is here also supported on the valve set screw (21), respectively the valve plate (26) which rests against the control piston (60). The valve spring (11) arranged in the valve space (12) can thereby efficiently act upon the control piston (60) and thereby also on the valve piston (10), so that they can open only when the set spring force is surpassed. The setting of the valve spring (11) takes place over the already mentioned adjusting screw (21), which is twistably arranged on the head part. It has a hexagonal socket, in order to simplify the adjustment.

The sealing of the valve piston (10) designed as a tubular sleeve (20) takes places on the one hand, as already mentioned, over the lower sealing ring (19) lodged in an annular groove (55) and on the other hand, over the sealing ring (51) lodged in the annular groove (50).

The pressure medium streaming through the inlet bore (13) into the pressure-relief valve (1) flows via blind bore (14) until it reaches the lid (79) representing the upper limit of the valve piston (10). This lid (79) is provided with flow passages (80, 81), so that the pressure medium present in the blind bore (14) flows at the same time also into the area above the valve piston (10), so that the latter maintains its illustrated position, because the pressure conditions are the same in both chambers (46, 47). At the same time, the pressure-medium flow passes through the control piston (60), which has a blind bore (62) and on its extremity, radial bores (63, 64). The control piston (60) with its blind bore (62) and its radial bores (63, 64) is sealed off with respect to the spring space (12) by the sealing ring (75) which also has a groove (76) with bevel (77), so that only when this sealing ring (75) is overriden, can the pressure medium penetrate the spring space (12). Due to the design of the valve piston (10) and the flow-passage openings (80, 81) provided in the lid (79), this becomes possible only when the force of the valve spring (11) is surpassed, for instance when the hydraulic unit is subjected to a correspondingly excessive load as a result of rock pressure. Since the outer wall of the control piston (6) is smooth and this sealing ring (75) has a relatively reduced diameter, the occurring friction forces are so low that the closing values of the valve as a whole are not impaired.

The sealing rings (19, 51) rub against the outer wall (29) of the valve piston (10), respectively the tubular sleeve (20), thereby protecting the area of the transversal bore (17) and therewith the surroundings from the exit of the pressure medium. When the valve piston (10) is displaced or moved, this friction leads intentionally to an impairment of the travel motion. When the valve is triggered, this remains negligible, but during the return stroke it insures favorable closing values when these sealing rings (19, 51) are made of a plastic teflon material TFM 1600 ®. Such sealing rings with rectangular cross sections result in clearly favorable sealing values, but produce very little friction, so that the travel of the valve piston (10) are hindered to a conceivably small extent. Due to the hardness of this plastic teflon material, optimal service life is achieved and as a result of the use of rectangular sealing rings an improvement of the overall sealing is reached particularly in cooperation with the bevels (58, 54 and 77). Namely the sealing ring (51) also rests in an annular groove (52) with a bevel (54) connecting the support wall (52) and the groove bottom (53).

The lower sealing ring (19) lodged in the annular groove (55) can be easily mounted, in spite of its reduced flexibility, since in the inlet bore (13) a plug-in socket is introduced from the opening direction (61). This plug-in socket (85) is sealed downwardly by the sealing ring (86) and the support ring (87) and upwardly by the O-ring (88) and the support ring (89). This is shown clearly especially in FIG. 5. The upper area or also the inner area of the pressure-relief valve is safeguarded and sealed by the sealing ring (51) as per FIGS. 4 and 5, since it is fastened via the guide screw (90) which is sealed via O-ring (91) and support ring (92). The mounting of the screw guide (90) is facilitated by the recesses (93), which make possible a direct screwing into the thread. Besides, the plug-in socket (85) can be easily inserted, since by design it is under the action of the pressure medium and is pressed into the connection piece (5). The opening of the inlet bore (13) is correspondingly widened, in order to receive the plug-in socket (85) as well as the guide screw (90).

I claim:

1. A pressure-relief valve for protection of hydraulic units in underground mining functionable against a sudden overload in pressure, comprising:

a valve housing including an upper part and a connection piece;

a valve spring lodged in said upper part;

a valve piston arranged and longitudinally slidable within said connection piece, said valve piston being engageable forceably against said valve spring, said valve piston including a blind bore and radial bores, said radial bores being perpendicular to and communicating with said blind bore, and a pressure medium being flowable through said bores;

at least one sealing ring arranged in said connection piece over which said piston travels, said sealing ring being positioned to correspond adjoiningly with said radial bores, and said sealing ring consisting of a very hard plastic material producing very low friction and having a rectangular cross section; and at least one annular groove within said connection piece receiving a respective said rectangular sealing ring, said at least one annular groove being defined by a groove bottom and a support wall perpendicular thereto with a bevel connecting said groove bottom and said support wall.

2. The pressure-relief valve according to claim 1, wherein said support wall is arranged slightly above said radial bores when said relief valve is in a closed position.

3. The pressure-relief valve according to claim 1, wherein said bevel is arc-shaped.

4. The pressure-relief valve according to claim 1, wherein said valve piston is an integrated control piston formed with a chamber, said connection piece further including transverse bores therewithin serving as outlet bores from said chamber upon communication of said radial bores therewith, one of said sealing rings being provided above and another below said transverse bores in respective annular groove formed in said connection piece, each of said grooves having a respective bevel at a respective support wall.

5. The pressure-relief valve according to claim 1, wherein a further one of said sealing rings is lodged in a further groove with a respective bevel, said further sealing ring being positioned above the sealing rings provided above and below said transverse bores and formed of a plastic material producing little friction.

6. The pressure-relief valve according to claim 4, further comprising an inlet bore leading into said connecting piece at an end thereof opposite an end of said connecting piece contacting said valve spring, and an inwardly and outwardly stepped plug-in socket being inserted within said inlet bore, said plug-in socket including an O-ring and being fastened against a lowermost one of said sealing rings.

7. The pressure-relief valve according to claim 4, further comprising an inlet bore within said connecting piece, and a guide screw arranged on an outlet side of said inlet bore, said guide screw having an O-ring and fastening one of said sealing rings that is closest to said valve spring while at the same time guiding said control piston.

8. The pressure-relief valve according to claim 1, wherein the plastic material forming the at least one sealing ring is formed of a polyperfluoro-olefin.

* * * * *